US006889124B2

(12) United States Patent  
Block et al.

(10) Patent No.: US 6,889,124 B2
(45) Date of Patent: *May 3, 2005

(54) METHOD AND APPARATUS FOR REDUCING FALSE TAWS WARNINGS AND NAVIGATING LANDING APPROACHES

(76) Inventors: Gerald J. Block, 2401 Dogwood Way, Vista, CA (US) 92083; Albert J. Bourdon, 2401 Dogwood Way, Vista, CA (US) 92083

(*) Notice: Subject to any disclaimer, the term of this patent is extended or adjusted under 35 U.S.C. 154(b) by 0 days.

This patent is subject to a terminal disclaimer.

(21) Appl. No.: 10/391,452

(22) Filed: Mar. 18, 2003

(65) Prior Publication Data

US 2004/0093131 A1 May 13, 2004

Related U.S. Application Data

(63) Continuation of application No. 09/976,251, filed on Oct. 11, 2001, now Pat. No. 6,591,170.
(60) Provisional application No. 60/239,319, filed on Oct. 10, 2000.

(51) Int. Cl.$^7$ ................................................ G05D 1/00
(52) U.S. Cl. ............................... 701/9; 701/3; 701/14; 244/75 R; 340/945
(58) Field of Search ............................. 701/1, 3, 4, 6, 701/9, 13–14, 16; 244/75 R, 158 R; 340/945

(56) References Cited

U.S. PATENT DOCUMENTS 5,057,835 A    10/1991   Factor et al.
5,467,085 A    11/1995   Dunn
5,475,594 A    12/1995   Oder et al.
5,521,658 A     5/1996   Donohoe
5,543,870 A     8/1996   Blanchard
5,561,854 A    10/1996   Antic et al.
5,594,942 A     1/1997   Antic et al.
5,651,676 A     7/1997   Artwick
5,677,842 A    10/1997   Denoize et al.
5,726,719 A     3/1998   Tanaka et al.
5,839,080 A    11/1998   Muller et al.
5,999,924 A    12/1999   Bair et al.
6,092,009 A     7/2000   Glover
6,122,570 A     9/2000   Muller et al.
6,138,060 A    10/2000   Conner et al.
6,148,308 A    11/2000   Neubauer et al.
6,219,592 B1    4/2001   Muller et al.
6,591,170 B2 *  7/2003   Block et al. ................... 701/9

* cited by examiner

Primary Examiner—Gertrude A. Jeanglaude
(74) Attorney, Agent, or Firm—Mark D. Wieczorek

(57) ABSTRACT

A system for reducing nuisance alerts and warnings in a terrain awareness and warning system for an aircraft, including determining if the aircraft is within a predetermined geometric volume surrounding an airport. If the aircraft is within the geometric volume, then determining the aircraft's current projected flight path for a selected distance or time and comparing it with at least one approach volume extending from a runway at the airport towards an outer boundary of the geometric volume. If the aircraft's current projected flight path is such that the aircraft is expected to be within the approach volume and stay within the approach volume to the runway, then inhibiting selected alerts and warnings associated with non-threatening terrain.

30 Claims, 14 Drawing Sheets

METHOD AND APPARATUS FOR REDUCING FALSE TAWS WARNINGS AND NAVIGATING LANDING APPROACHES

CROSS-REFERENCE TO RELATED APPLICATIONS

This is a continuation of U.S. patent application Ser. No. 09/976,251, entitled "METHOD AND APPARATUS FOR REDUCING FALSE TAWS WARNINGS AND NAVIGATING LANDING APPROACHES", filed Oct. 11, 2001, now U.S. Pat. No. 6,591,170, which is a Provisional Patent Application Ser. No. 60/239,319 filed Oct. 10, 2000, entitled "TERRAIN AWARENESS AND WARNING SYSTEM (TAWS) for Aircraft," which is incorporated herein by reference in its entirety.

FIELD OF THE INVENTION

The present invention relates to avionics, and more particularly to Terrain Awareness and Warning Systems (TAWS) and navigational systems.

BACKGROUND OF THE INVENTION

A conventional altitude display for a terrain awareness system for a given aircraft provides a pilot with a visual display of the terrain having an altitude higher than the aircraft, as well as the terrain within some distance (e.g. 2000') below an aircraft. If it appears that the aircraft is going to hit or travel relatively close to terrain, various alerts and warnings are generated. See, e.g., U.S. Pat. No. 6,138,060 to Conner et al. As used herein, warnings relate to more threatening conditions than alerts. Each may include audible, visual or other type of indications to a user.

One problem with conventional systems is false or nuisance alerts and warnings may be generated as the aircraft is preparing to land at a runway. That is, as the aircraft descends it will naturally appear to be headed towards terrain (the runway), and nuisance alerts and warnings may be generated. Furthermore, the terrain may still be displayed on the aviation display unit. As a result, the screen may be cluttered with non-threatening terrain data during landing.

SUMMARY OF THE INVENTION

The present invention, in certain embodiments, overcomes the disadvantages of the prior art noted above.

In one aspect, the invention is directed to a system for reducing nuisance alerts and warnings in a terrain awareness and warning system for an aircraft, including determining if the aircraft is within a predetermined geometric volume surrounding an airport. If the aircraft is within the geometric volume, then determining the aircraft's current projected flight path for a selected distance or time and comparing it with at least one approach volume extendsing from a runway at the airport towards an outer boundary of the geometric volume. If the aircraft's current projected flight path is such that the aircraft is expected to be within the approach volume and stay within the approach volume to the runway, then inhibiting selected alerts and warnings associated with non-threatening terrain.

In another aspect, the invention is directed to a terrain awareness and warning system for an aircraft comprising a display apparatus which displays terrain within a predetermined look-ahead region based on the aircraft's current projected flight path and generates alerts and warnings for terrain in or proximate to the aircraft's current projected flight path; and an inhibition module which inhibits at least one of said alerts, warnings and terrain display under at least the following conditions: the aircraft is within a predetermined geometric volume surrounding an airport, and the aircraft's current projected flight path is such that the aircraft is expected to be within an approach volume that extends from a runway at the airport towards an outer boundary of the geometric volume and to stay within the approach volume to the runway.

In another aspect, the invention is directed to a method of navigating an aircraft to land on a runway, comprising determining if the aircraft is within a predetermined geometric volume surrounding an airport; if the aircraft is within the geometric volume, then determining the aircraft's current projected flight path for a selected distance or time; comparing the aircraft's current projected flight path with an approach volume extending from a runway at the airport towards an outer boundary of the geometric volume; if the aircraft's current projected flight path is such that the aircraft is expected to be within the approach volume and stay within the approach volume to the runway, then indicating that the aircraft is on proper course for landing; and if the aircraft's current projected flight path is such that the aircraft is not expected to within the approach volume or to stay within the approach volume to the runway, indicating that the aircraft is not on proper course for landing.

In another aspect, the invention is directed to a method of calculating an approach volume for a runway for use with a terrain awareness and warning system or navigation system in an aircraft, comprising (a) setting a predetermined geometric volume surrounding the runway;

(b) selecting a location along said runway as a ground point intercept (GPI); (c) selecting a most preferred approach path glide slope angle; (d) selecting lateral boundaries for the approach volume; (e) considering a tentative lower approach path plane that intersects the GPI and extends to an outer boundary of the geometric volume at an angle that is a predetermined amount more acute than said approach path glide slope angle; (f) determining whether the tentative lower approach path plane clears all terrain from the GPI to the outer boundary of the geometric volume by a predetermined safety margin, and if so, selecting the tentative lower approach path plane as an actual lower approach path plane, and if not, increasing the approach path glide slope angle and repeating steps (e) and (f) until the actual lower approach path plane is selected; (g) selecting an upper approach path plane, which extends from a predetermined location on the runway toward the outer boundary of the geometric volume at angle selected such that the upper approach path plane represents a maximum desirable approach path for the approach path volume.

In another aspect, the invention is directed to a terrain awareness and warning system for an aircraft comprising means for displaying terrain within a predetermined look-ahead region based on the aircraft's current projected flight path and generating alerts and warnings for terrain in or proximate to the aircraft's current projected flight path; and means for inhibiting at least one of said alerts, warnings and terrain display under at least the following conditions: the aircraft is within a predetermined geometric volume surrounding an airport, and the aircraft's current projected flight path is such that the aircraft is expected to be within an approach volume that extends from a runway at the airport towards an outer boundary of the geometric volume and to stay within the approach volume to the runway.

In another aspect, the invention is directed to a method of reducing at least one of nuisance alerts and warnings in a terrain awareness and warning system for an aircraft, comprising (a) determining if the aircraft is within a predetermined geometric volume surrounding an airport; (b) if the aircraft is within the geometric volume, then determining a current projected flight path for a selected distance or time for the aircraft; (c) comparing the aircraft's current projected flight path with at least one approach volume extending from a runway at the airport towards an outer boundary of the geometric volume; and (d) if the aircraft's current projected flight path is such that the aircraft is expected to intersect the approach volume, then determining whether, under selected parameters, the aircraft is capable of maneuvering within said approach volume so as to stay within the approach volume to the runway; (e) if the determination of step (d) is positive, then inhibiting at least one of selected alerts and warnings associated with terrain and repeating step (d); (f) if the determination of step (d) is negative, then reactivating any previously inhibited alerts and warnings of step (e).

Other aspects, objects and advantages will be apparent from the description that follows, including the figures and the claims.

DETAILED DESCRIPTION OF THE PREFERRED EMBODIMENTS

Figure 1:
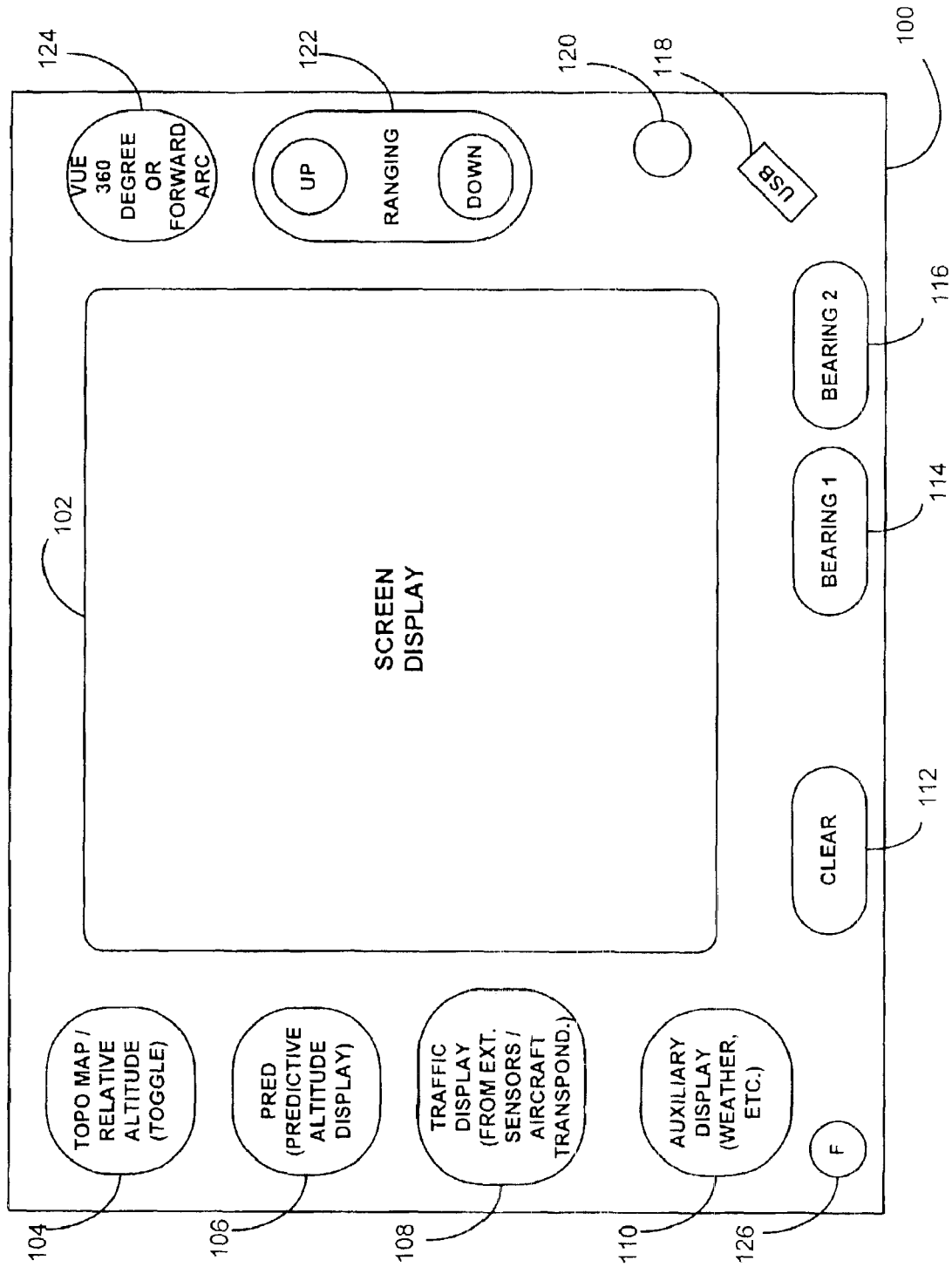
FIG. 1 is a schematic drawing of an apparatus according to an embodiment of the present invention, showing in particular the display and button layout.

Referring to FIG. 1, a display apparatus 100 for a terrain awareness and warning system (TAWS) is shown that may incorporate the present invention. The display apparatus 100 employs a screen display 102, which may be an LCD rear projection screen such as that disclosed in U.S. Pat. No. 6,259,378, owned by the assignee of the present invention and hereby incorporated by reference in its entirety. The display apparatus 100 further includes various surrounding buttons and interfaces.

An exemplary layout for the display apparatus 100 will now be described. However, it should be appreciated that the particular button and function layout described below is merely an example and the invention is not limited thereto.

Upon depression of the toggle button 104, the screen display may toggle between a topographic display and a relative altitude display. Upon depression of the predictive altitude display ("PRED") button 106, the screen display 102 changes to the PRED display, which is described in greater detail in co-pending U.S. patent application Ser. No. 10/300,167, entitled "Method and Apparatus for Predictive Altitude Display" filed on even date herewith.

A traffic display button 108 may cause a display of local air traffic in the vicinity of the aircraft. This function may employ as inputs the sensor readings from transponders on aircraft operating within radio range of the subject aircraft. An auxiliary button 110 may display a variety of information, such as weather, ancillary navigational aids, and so on.

A function button 126 may be provided to allow the user to select more than the usual input or inputs from the various other buttons. For example, the function button 126 may be used to enhance the ability of the user to perform a setup of the apparatus. As another example, during an alert or warning, pressing the function button 126 may result in a muting of the alert or warning. Preferably, if an alert status were indicated, the display screen 102 would switch to a display of that function which would allow the pilot to most effectively find a solution to the situation. In many cases, the PRAD function would be the most pertinent such display.

A light sensor 120 may be employed to automatically control the brightness and contrast of the screen display 102 for improved visibility. A micro-USB port 118 may be employed to allow an external input/output of data from the display apparatus 100. As explained in more detail below, various data, such as airport runway information, topographical data and runway approach data may be up-loaded to the display apparatus 100 prior to use. It may be necessary to periodically update this information and the micro-USB port 118 may be used for this purpose, although other methods and apparatus are within the scope of the invention. For example, the data may be updated by wireless link.

Finally, a ranging button 122 may allow a zoom in or out of the display, and a VUE button 124 may toggle the display between a 360° display and a forward arc display of, e.g., 70°. Such choices may especially be useful for the functions invoked by buttons 104, 106, and 108.

Generally, in use, the display apparatus 100 receives data concerning the position of the aircraft, its ground track, lateral track, velocity, altitude, height off ground and other data. This data is compared with pre-stored data concerning terrain in the proximity of the aircraft as well as terrain that will be within proximity of the aircraft within a selected look-ahead distance or time based on the projected flight path. The desired look-ahead distance or time may be dynamically adjusted by the user or system. For example, the system may be set to a 10 second look-ahead, which would provide a display of terrain that the aircraft will come in proximity to in the next 10 seconds, based on the projected flight path, which may be calculated based on data including the current heading, air speed, ground track, etc. The system may adjust the look-ahead distance/time based on phase of flight.

Terrain as used herein includes natural as well as man-made obstacles and topographical features. For example, tall buildings, tall antenna towers and mountain ranges are all considered "terrain" as the word is used herein.

Depending on the relationship (or projected relationship) of the aircraft to the terrain, the terrain may or may not be displayed on the display device 100. For example, if it appears that the aircraft will fly into or very close to the terrain, the terrain may be displayed in red on the display device 100 and/or an audible warning may be generated to alert the user of the danger. For somewhat less threatening situations, the terrain may be displayed in yellow and/or an audible alert may be generated. For situations in which the aircraft is not in a threatening relationship to the terrain, the terrain may be displayed in green, and for terrain that is sufficiently distanced from the aircraft (either far below the aircraft flight path or far afield from it), the terrain may not be displayed.

As explained above, a special situation arises when the aircraft is preparing to land. As the aircraft approaches the airport runway, it naturally comes close to terrain (e.g., the runway, nearby runways, air traffic control towers, nearby hills, etc.). As a result, if the system were to continue its normal mode of operation, audible alerts and/or warnings might be generated and a great amount of terrain might be displayed as threatening (e.g., in red or yellow), even for the safest of landing approaches. As a result, almost the entire field of view of the display apparatus 100 might turn to red or yellow, thus providing no discrimination between real threats (e.g., a mountain range near the airport) and non-threats (e.g., the runway at which the aircraft is landing).

As explained in more detail below, the present system may provide predetermined runway approach data for different runways. In one embodiment, an approach volume is generated for each runway at which the aircraft may land.

If the aircraft is within the approach volume or is projected to enter it, and the aircraft's projected flight path is within the approach volume to the runway, it is assumed that the aircraft is landing and terrain warnings and alerts may be inhibited. In certain embodiments, the terrain display feature is also inhibited so that the display apparatus 100 does not display any terrain.

As many airports have multiple runways and, in many cases, aircraft are able to land in either direction on a given runway, multiple approach volumes may be generated for each airport.

As an aircraft nears the airport, the system may determine at which runway the aircraft is most likely to land (and thus determine the appropriate approach volume). As explained in more detail below, this may be done in several ways. For example, if a particular runway has been entered into the system (e.g., by interface with a flight management system), the associated approach volume may be easily selected. Alternatively, the system may repeatedly monitor the aircraft's current flight path and predict at which runway the aircraft will be landing and select the associated approach volume. In certain embodiments, multiple approach volumes may be predicted and ranked or simultaneously used.

In certain embodiments, this process of searching for appropriate search volumes begins or is triggered when the aircraft is not in a take-off phase of flight and enters into a predetermined airport zone 200.

Figure 2A:
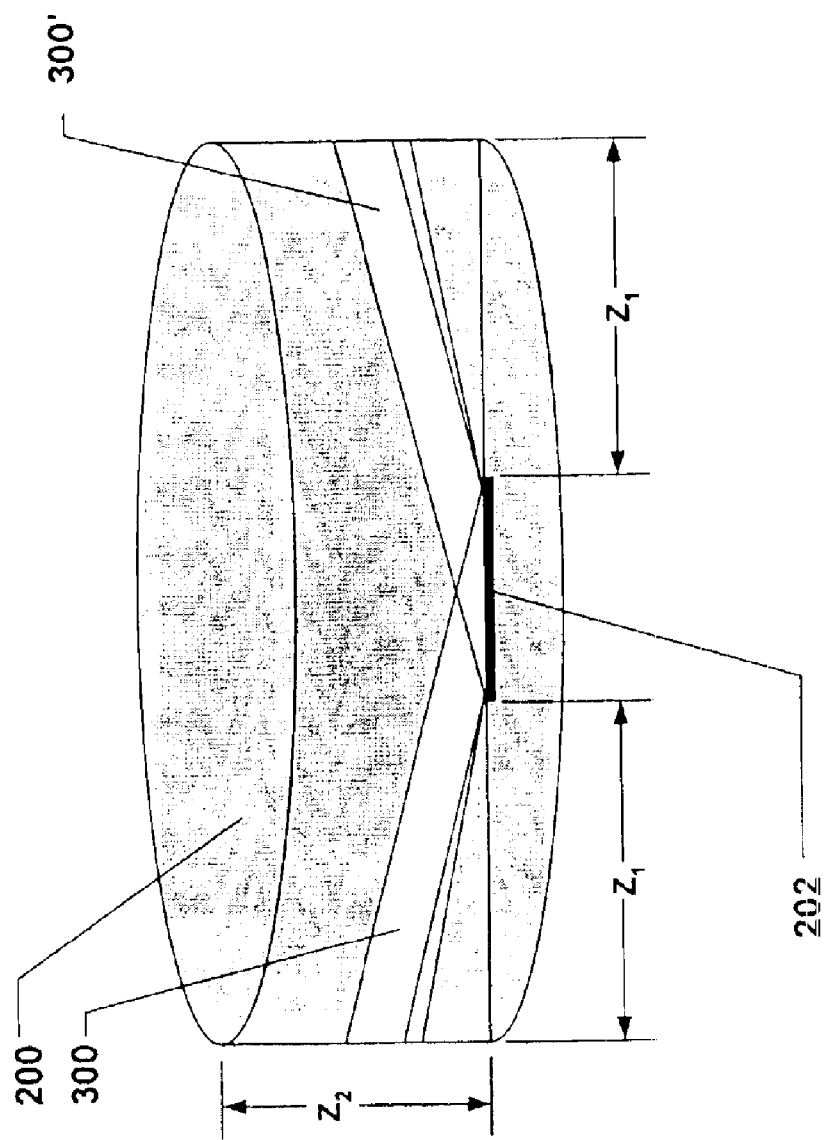
FIG. 2A illustrates an exemplary airport zone that may be used in certain embodiments of the present invention.

FIG. 2A illustrates an exemplary airport zone 200. The airport zone 200 may extend for a predetermined distance Z1 in all directions, from the ends of a runway 202 and for a predetermined height Z2 above the runway 202. In one embodiment, Z1 is 5 nautical miles (NM) and Z2 is selected from the range of 1900 to 5000 feet. Separate approach volumes 300 and 300' are shown for each end of runway 202.

Figure 2B:
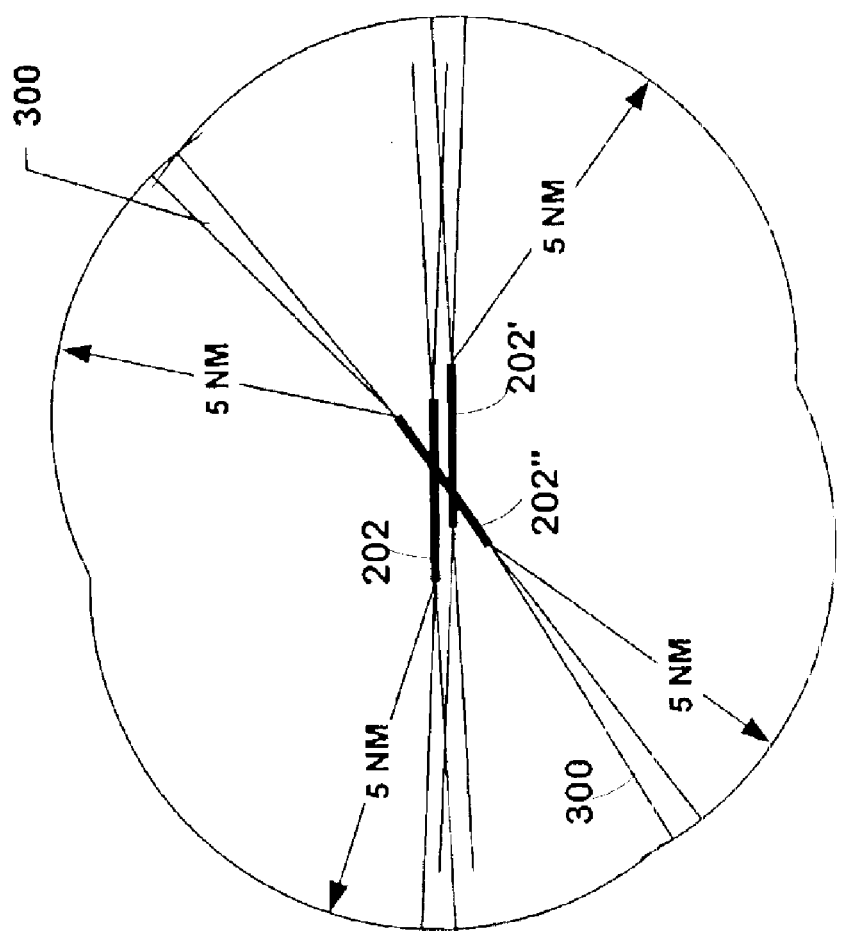
FIG. 2B illustrates a top view of a plurality of intersecting airport zones according to certain embodiments of the present invention.

A separate airport zone 200 may be created for each runway of an airport such that multiple overlapping zones 200 may be created. FIG. 2B illustrates a top view of such an arrangement where Z1 is 5 NM and three runways 202, 202' and 200" are present. Also shown, are separate approach volumes 300 for each end of each runway 200—200".

The approach volume 300 will now be discussed in more detail. In general, the approach volume is based upon a preferred landing approach for the given runway 202, while providing a predetermined amount of variance zone, in all directions, about the preferred landing approach.

Figure 3:
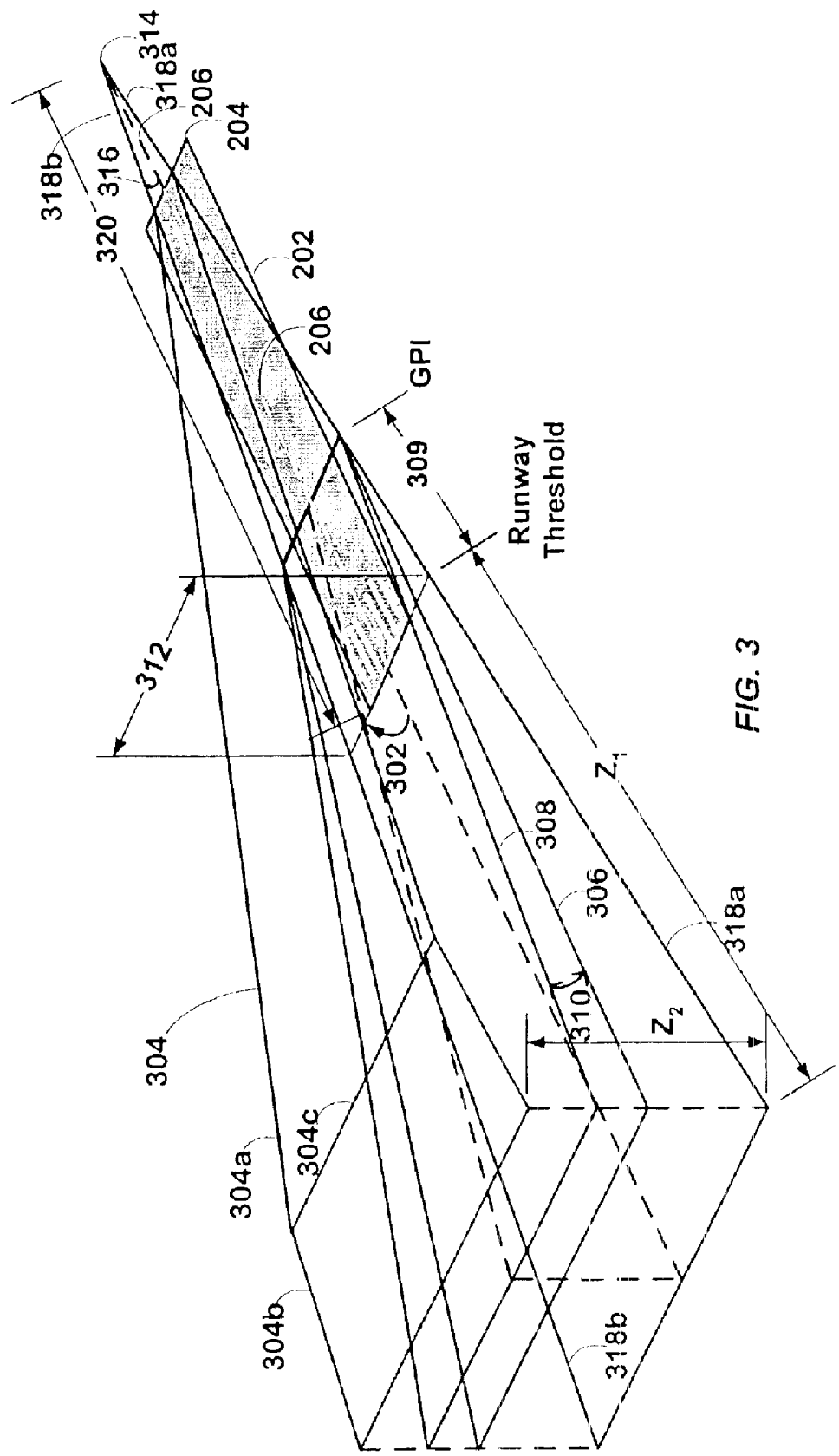
FIG. 3 illustrates an exemplary approach volume associated with a runway, according to certain embodiments of the present invention.

FIG. 3 illustrates an exemplary approach volume 300 associated with one end of runway 202. In the example shown in FIG. 3, a straight-in approach is assumed and a constant approach path glide slope angle 302 is shown. That is, the aircraft is able to fly straight to the runway throughout the entire airport zone 200 and is able to safely clear any obstacles or terrain while maintaining the same glide slope angle 302. In this example, angle 302 is 3°. More complicated examples, with off-set approaches and drop down glide slope angles, will be discussed later.

While the approach volume 300 in certain embodiments of the invention has a wedge-like shape, as shown in FIG. 3, it should be appreciated that the approach volume 300 is not limited to such a shape. For example, a conical or any other suitable shape could be used.

As seen in FIG. 3, the approach volume 300 may include an upper approach path plane 304 and a lower approach path plane 306. In certain embodiments, at a predetermined distance from the runway, the upper approach path plane 304 may level out to a constant height above the runway 202. As such, the upper approach path plane 304 may be technically made up of two separate geometric planes 304a and 304b that intersect at line 304c. Moreover, as explained in more detail below, the lower approach path plane 306 may have multiple geometric planes if a drop down angle region is used. The upper and lower approach path planes (304, 306) are above and below, respectively, an approach path glide slope plane 308.

One method for determining the approach volume 300 will now be described; however, it will be understood that other methods of determining the approach volume 300 are within the scope of the invention.

The ground point intercept (GPI) is located. This is the preferred location along the runway where the aircraft will touch down and may be thought of as being at a distance 309 from the runway threshold. The runway threshold is the outermost portion of the runway that may be used for landing. In the example of FIG. 3, the runway threshold corresponds to the actual end of the runway, but as shown later, an offset is sometimes present.

The GPI may be based on published Instrument Landing System (ILS) guidelines or other means. The GPI may also be calculated by selecting a point at a predetermined height (e.g., 55 feet) above the runway threshold and ensuring that the approach path glide slope plane passes through that point.

The approach path glide slope plane 308 may originate at the GPI (or the runway threshold) and extend out from the runway 202 at the desired glide slope angle 302. Preferably, it extends outwardly to the outer boundary of the airport zone 200. The lower approach path plane 306 may also originate at the GPI (or runway threshold) and extends out from the runway 202 at a lower approach path angle, which is a predetermined amount 310 less than the glide slope angle 302. In one embodiment, the predetermined amount 310 is 0.7° so for a glide slope angle 302 of 3°, the lower approach path angle would be 2.3°.

The upper approach path plane 304 may begin at the far end 204 of the runway 202 as viewed by the aircraft landing via the approach volume under consideration. Upper approach path plane 304 may then extend out from the runway 202 to the outer boundary of the airport zone 200. However, in certain embodiments, the height above the runway of the upper approach path plane 304 is not allowed to exceed the maximum height Z2 of the airport zone 200. As such, the upper approach path plane 304 may taper off at a constant height as shown in FIG. 3 at line 304c, so as to form two intersecting geometric planes 304b and 304c.

The lateral boundaries of the approach volume may be selected such that a predetermined width 312 is encompassed by the volume at the runway threshold location.

To ensure the proper width 312, a lateral boundary vertex point 314 at a predetermined distance from the far end 204 of the runway 202 is used. Preferably, vertex point 314 lies along the centerline 206 of the runway 202. A lateral boundary angle 316 may be selected such that the desired width 312 is obtained. Angle 316 is measured from the centerline to each lateral approach path boundary 318a and 318b. In one embodiment, the angle 316 is +/−3.85° such that the angle between lateral boundaries 318a and 318b would be two times angle 316 or 7.7°. Thus, for this example, if the width 312 desired is 900 feet, then the distance 320 from the runway threshold to the vertex 314 would be 6686 feet. This may be calculated as follows:

$$\tan (3.85°)=(900\times 0.5)/(\text{distance } 320)$$

re-arranging the equation:

$$\text{distance } 320=450/\tan (3.85°)=450/0.0673=6686 \text{ feet.}$$

The lateral approach path boundaries 318a and 318b may extend away from the runway 202 to the outer boundaries of the airport zone 200.

While specific numerical examples have been shown above, the invention is not limited to these preferred examples. For example, angle 316 may preferably range from 1.5° to 4° and approach path glide slope angle 302 may preferably range from 3° to 5°.

Figure 4:
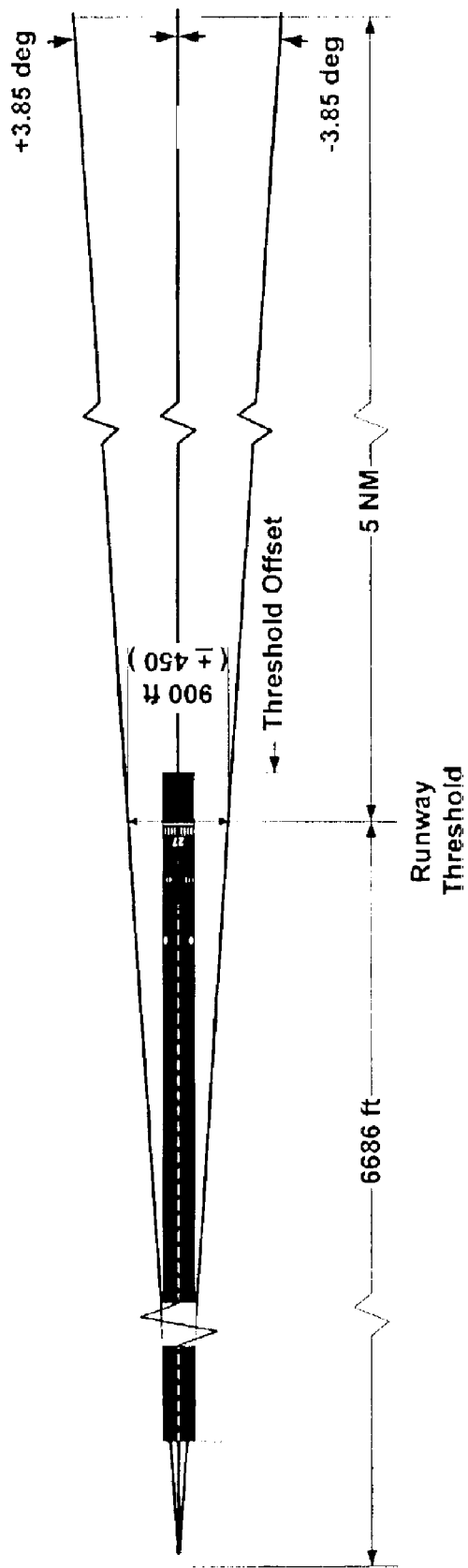
FIG. 4 illustrates a top view of an approach volume according to certain embodiments of the present invention.

FIG. 4 illustrates a top view of an approach volume using the numerical examples given above and having a non-zero threshold offset from the runway threshold to the end of the runway 202.

Figure 5:
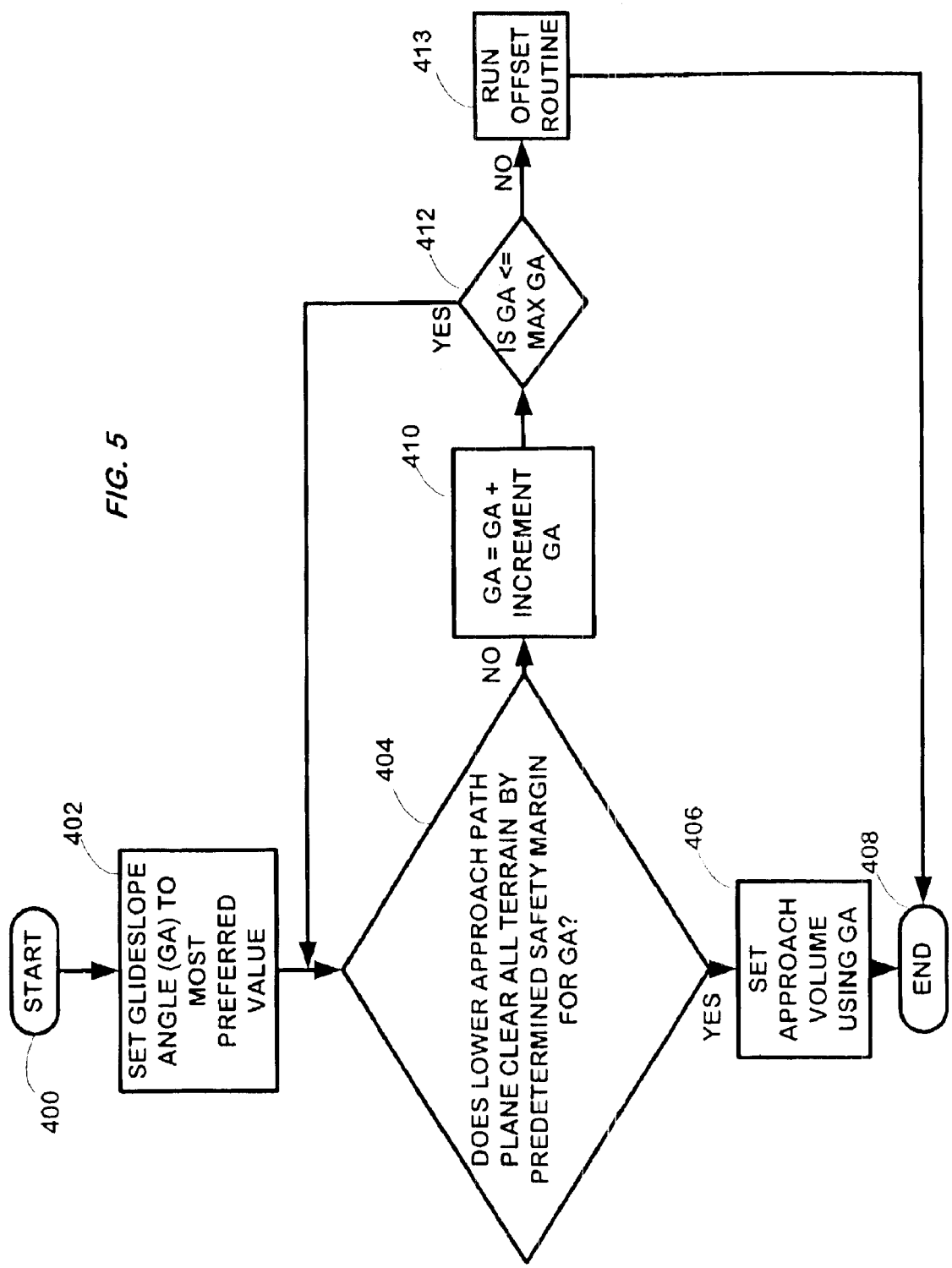
FIG. 5 illustrates a flow chart for determining a straight-in approach path glide slope angle, according to certain embodiments of the present invention.

It is not always possible to use the same approach path glide slope angle 302 for every runway 202 (or even when approaching from the other end of the same runway), as some approach volumes may then encompass terrain. As a result, a more steep or different approach path glide slope angle 302 may be used. FIG. 5 illustrates a flow chart for determining the correct approach path glide slope angle 302 for a given approach volume.

The process is started in step 400 and the approach path glide slope angle 302 (referred to as GA in FIG. 5) is initially set at the most desired angle. In the example given above, GA may initially be set to 3°. In step 404, it is determined whether the entire lower approach path plane 306 will clear all obstacles from the beginning of the airport zone 200 to the GPI, for the given GA, by a predetermined safety margin. The safety margin may the same amount (e.g., 75 feet) for the entire approach volume or it may be vary for the portions of the approach volume closer to the runway 202 (e.g., 75 feet from the outer boundary of airport zone 200 up to 10,000 feet from the runway threshold and then 25 feet).

If the answer in step 404 is yes, then the approach volume is set in step 408 using the current GA.

If the answer in step 404 is no, then the GA is incremented in step 410 by an increment amount (e.g., 0.5°). In step 412 it is determined whether the new GA is less than or equal to the maximum allowable GA (preferably 5°; alternatively, based on the aircraft capability up to 5.5°). If the answer in step 412 is yes, then the process is repeated starting at step 404. If the answer in step 412 is no, then it is determined in step 413 that a straight-in approach volume will not be used and an approach volume that has at least a portion that is offset from the centerline of the runway will be used. A method for determining an approach volume with at least a portion that is offset is explained below.

Figure 6:
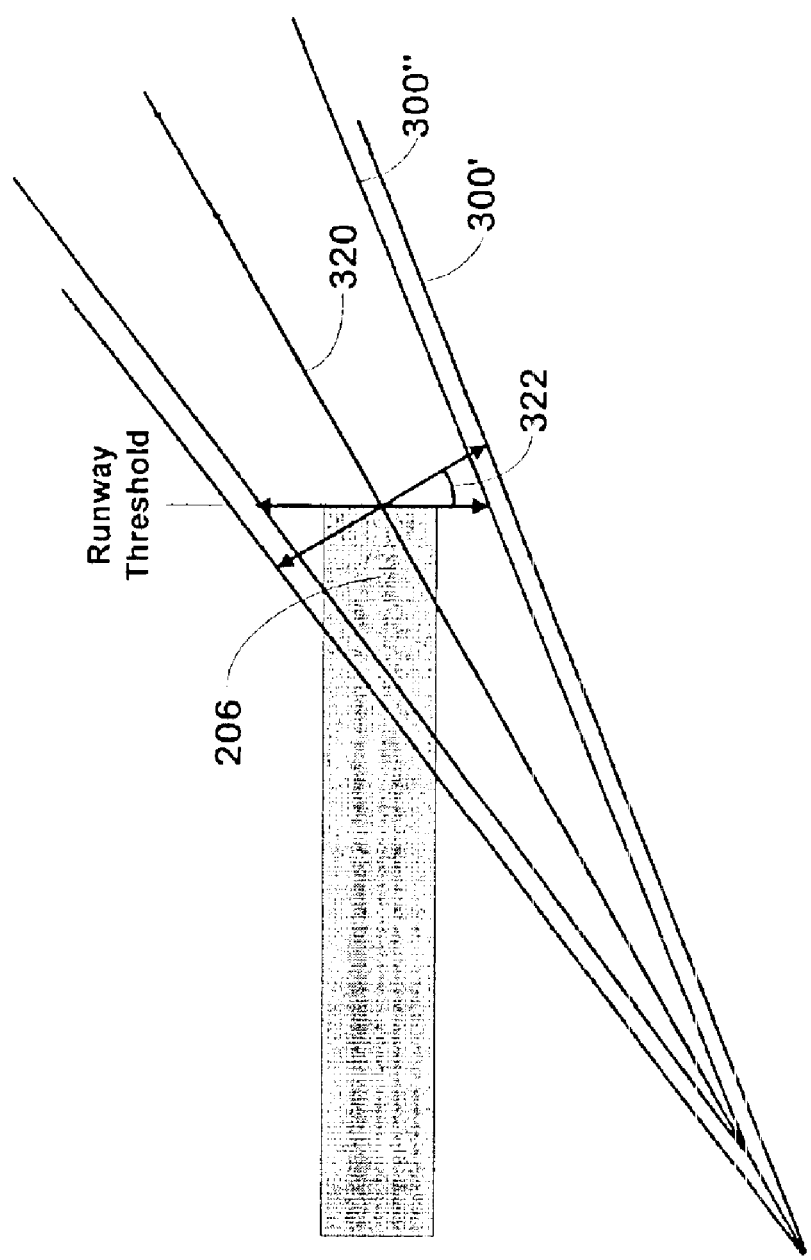
FIG. 6 illustrates a top view of an offset approach volume and corrected offset approach volume, according to certain embodiments of the present invention.

FIG. 6 illustrates a top view of an offset approach volume 300' and a corrected offset approach volume 300". In FIG. 6 the lateral boundaries of a straight-in approach volume are rotated about the point where the runway centerline 206 and the runway threshold line cross. This results in the offset approach volume 300' having an approach offset angle 322. In certain embodiments, it is preferable to maintain the same width 312 at the runway threshold as that used in the straight-in approach. As such, the offset approach volume 300' is moved along its own centerline so that its width at the runway threshold is the same as width 312. This results in the corrected offset approach volume 300".

Figure 7:
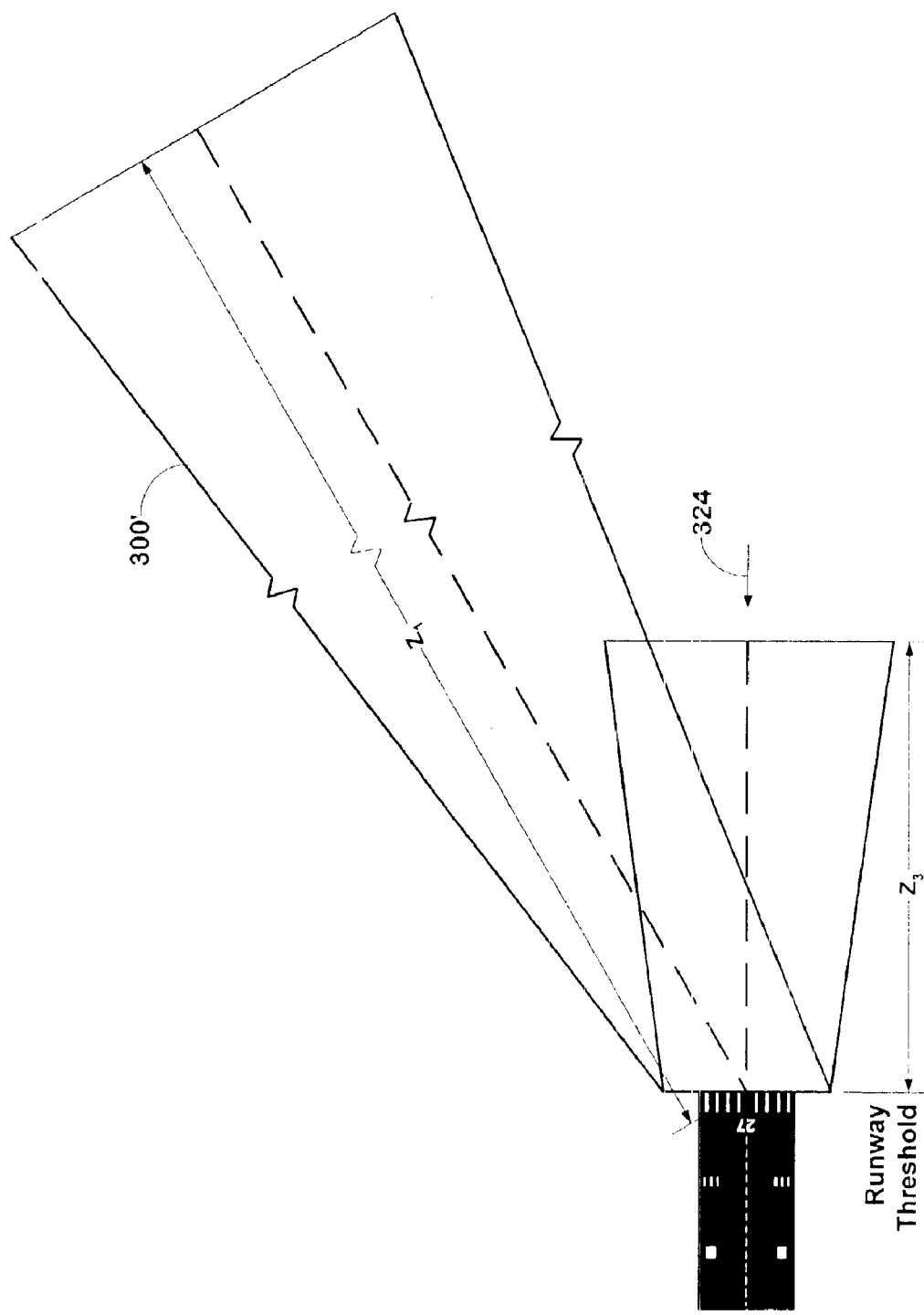
FIG. 7 illustrates a perspective view of an overlapping offset approach volume and short straight-in approach volume, according to certain embodiments of the present invention.

As shown in FIG. 7, a short straight-in approach volume 324 may also be calculated for use with the corrected offset approach volume 300". Unlike for the corrected offset approach volume 300" that extends for a distance Z1 to the outer boundary of the airport zone 200, the short straight-in approach volume 324 only extends a short distance Z3 from the runway threshold (e.g., 1 NM or as far as possible without intersecting terrain). In practice, the aircraft may fly along corrected offset approach volume 300" until it is about the distance Z3 from the runway 202. Then, the aircraft will maneuver into the short straight-in approach volume 324 for landing.

Figure 8:
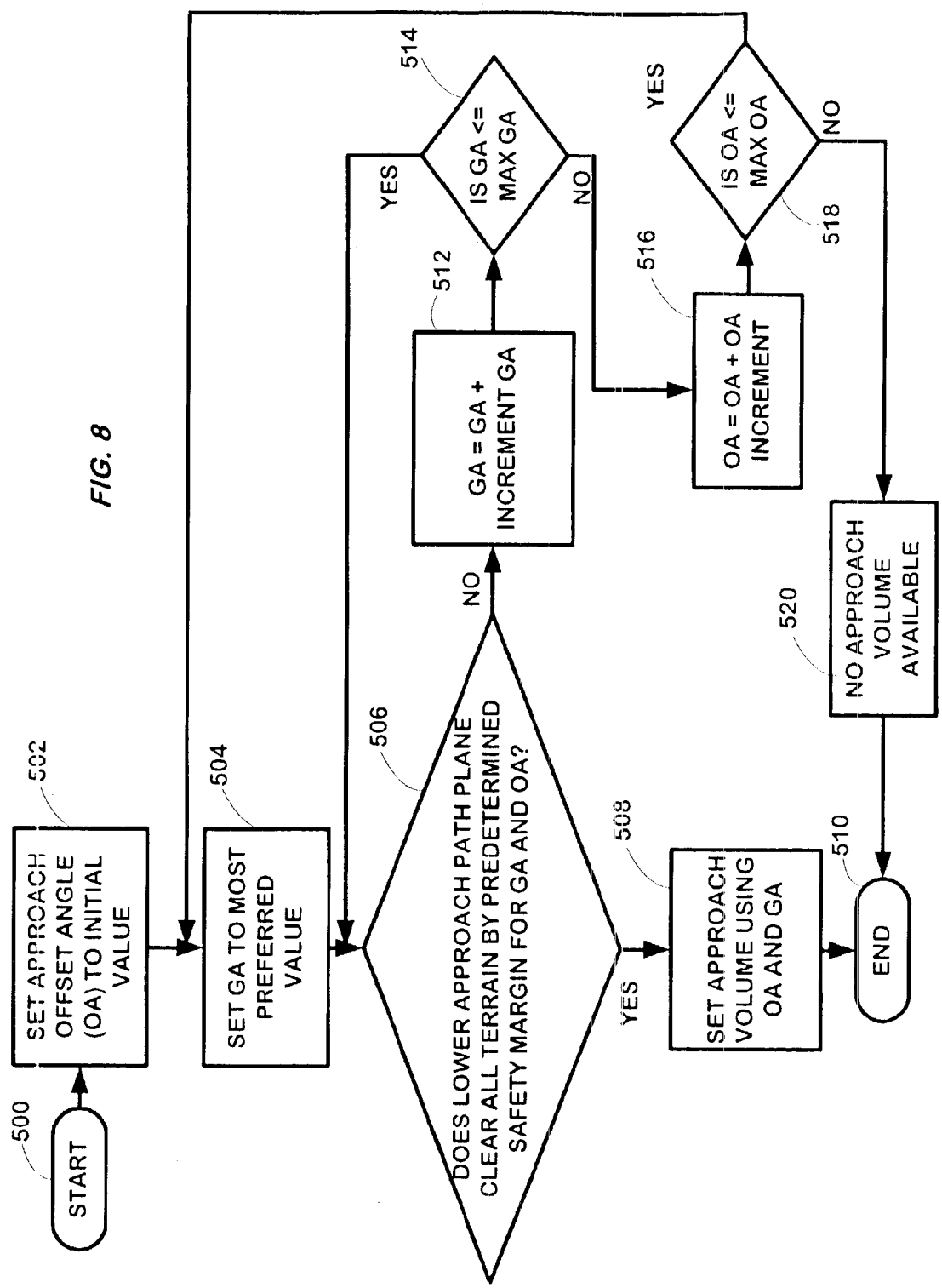
FIG. 8 illustrates a flow chart for determining a corrected offset approach volume, according to certain embodiments of the present invention.

FIG. 8 illustrates a flow chart for determining the corrected offset approach volume 300". In step 500 the process begins. In step 502 the approach offset angle 322 (referred to in FIG. 8 as OA) is set to an initial value so as to angle away from the terrain that prevented the straight-in approach calculation of FIG. 5. Preferably, this initial value is 0° or 0.5° degrees off the centerline of the runway. In step 504, the glide slope angle GA is reset to the most preferred value (e.g., 3°). In step 506, it is determined whether the entire lower approach path plane 306 will clear all terrain from the beginning of the airport zone 200 to the runway threshold, for the given GA and OA, by a predetermined safety margin. The safety margin may be the same amount (e.g., 75 feet) for the entire approach volume or it may vary for the portions of the approach volume closer to the runway 202 (e.g., 75 feet from the outer boundary of airport zone 200 up to 10,000 feet from the runway threshold and then 25 feet).

If the answer in step 506 is yes, then the corrected offset approach volume 300" is set in step 508 using the current GA and OA.

If the answer in step 404 is no, then the GA is incremented in step 512 by an increment amount (e.g., 0.5°). In step 514 it is determined whether the new GA is less than or equal to the maximum allowable GA (preferably 5°; alternatively, based on the aircraft capabilities, up to 5.5°). If the answer in step 514 is yes, then the process is repeated starting at step 506.

If the answer in step 514 is no, then OA is incremented in step 516 by an increment amount (e.g., 0.5°). In step 518 it is determined whether the new OA is less than or equal to the maximum allowable OA (preferably this is 30°). If the answer in step 518 is yes, then the process is repeated starting at step 504.

If the answer in step 518 is no, then it is determined that no appropriate approach volume is available in step 520 and the process is ended in step 510.

The short straight-in approach volume 324 will preferably have the same approach glide slope angle as used in the corrected offset approach volume just described above. Terrain clearance for the short straight-in approach volume may be performed, and the angle adjusted as necessary, in the same manner as explained above with reference to FIG. 5.

In either the offset approach volume scenario just described or the straight-in approach volume scenario described with reference to FIGS. 3–5, a modification may be made wherein a step down glide slope angle is provided. That is, while the aircraft may proceed at a steady approach glide slope angle 302 for most of the distance within airport zone 202, it may be desirable in certain embodiments for the aircraft to step down to a more acute approach glide slope angle shortly before landing.

Figure 9:
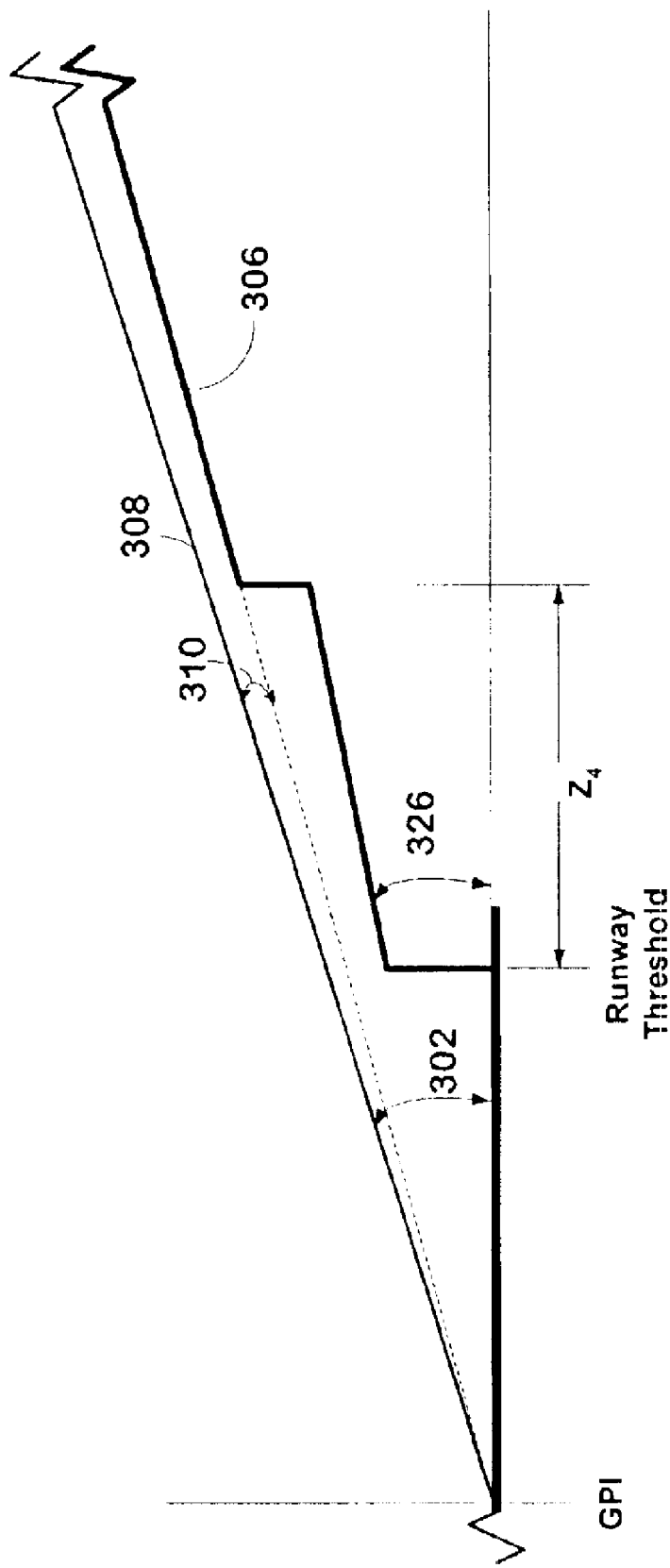
FIG. 9 illustrates a side view of an approach volume with a step down approach glide slope angle, according to certain embodiments of the present invention.

FIG. 9 illustrates a side view of such an approach volume with a step down approach glide slope angle. For simplicity the upper approach path plane 304 is not shown in this figure. As shown, the approach glide slope plane 308 begins at the GPI and extends outwardly as previously discussed at the approach path glide slope angle 302. The lower approach path plane 306 similarly extends from the GPI at an angle of (Angle 302–Angle 310). At a distance Z4 from the runway threshold a more acute approach path glide slope angle is introduced such that the lower approach path plane 306 steps down to angle 326. This has the effect of thickening the approach volume in the height above ground direction for the distance from Z4 to the GPI. The angle 326 may be verified for terrain clearance in the same manner as discussed above with reference to FIG. 5.

In addition, while the step-down glide slope has been shown as a true step-like function, a more curved or continuous adjustment to the lower approach path plane 306 may also be used.

The above description has explained how the approach volume is calculated for each runway approach. Preferably, these approach volumes are calculated "off line", that is, not while the aircraft is flying its route; although these calculations may be made on-line. Preferably, this information is then stored in the display apparatus 100 for reference during flight. This information may be updated regularly during aircraft maintenance, for example, by uploading via the micro-USB port 118 shown in FIG. 1. Alternatively, it may be updated remotely by satellite or other wireless link.

As explained above, preferably this data is used in a look-ahead TAWS system wherein terrain that will be in the proximity of the aircraft based on its current projected flight path is used to generate alerts and warnings and, as explained in more detail in co-pending patent application Ser. No. 10/300,167, entitled "Method and Apparatus for Predictive Altitude Display" filed on even date herewith, is actually displayed on the display apparatus. The present invention may be used to inhibit these warnings and alerts as well as the display of terrain data. That is, if it is determined that the aircraft is within or entering the approach volume and directed so as to stay within it to the runway 202, certain alerts and warnings are inhibited. Moreover, non-threatening terrain may also be inhibited from being displayed or will be only displayed in green as opposed to red or yellow as explained above.

In one embodiment, all alerts and warnings that would be generated while the aircraft is within the approach volume are inhibited. Further, all terrain that would be displayed while the aircraft is within the approach volume is inhibited from being displayed in the look-ahead display of the display apparatus 100. Of course, the user may select or deselect this mode of operation. Other uses of the data are also within the scope of the invention.

Figure 10:
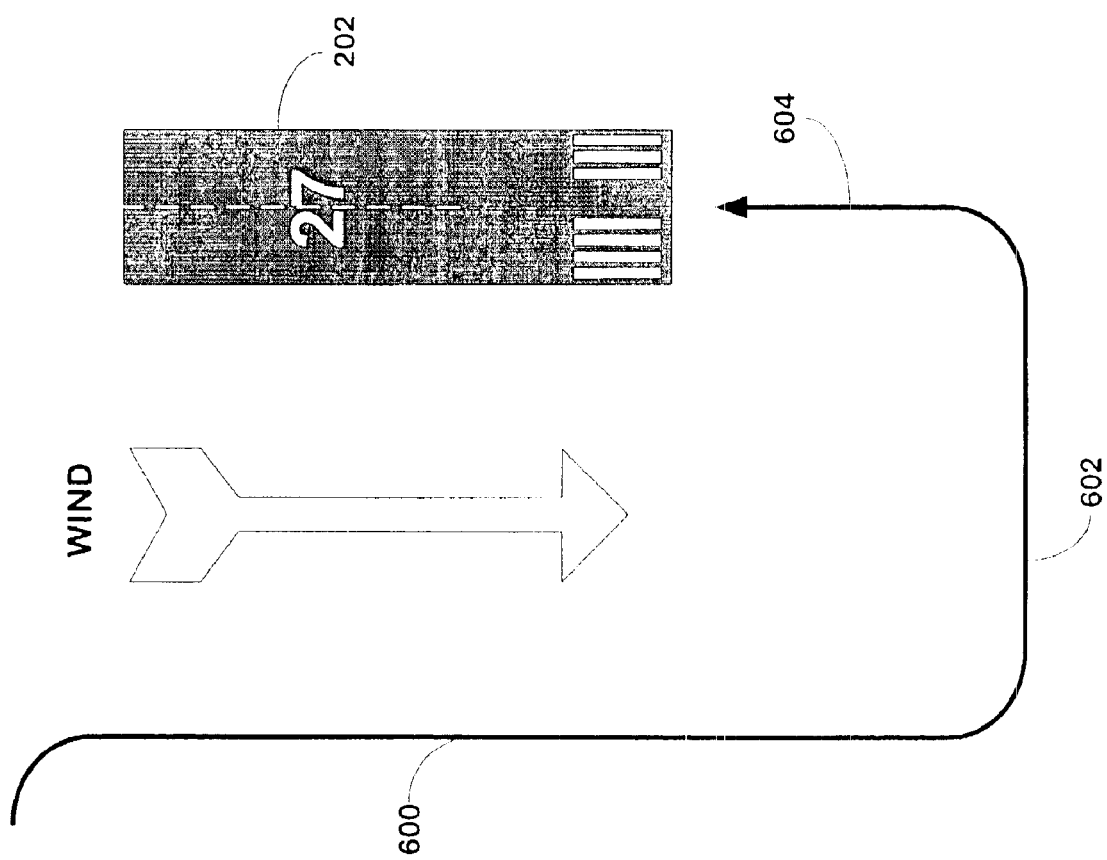
FIG. 10 illustrates a top view of a possible landing approach for an aircraft, according to certain embodiments of the present invention.

FIG. 10 illustrates a top view of a possible landing approach for an aircraft. As shown in FIG. 10, an aircraft often does not enter the airport zone 200 in direct or near direct alignment with the runway 202. Often, the aircraft will approach the runway 202 in the pattern shown, where the approach may be thought of as having three segments. Segment 600 is the downwind segment and is often substantially parallel to the runway 202. The aircraft then turns toward the runway in the base segment 602 and then substantially lines up with the runway 202 in the final approach segment 604. Segment 604 may often be relatively close to the runway threshold point (e.g., with 1–2 NM).

Accordingly, in certain embodiments of the invention, the system will predict if the aircraft will enter into the approach volume while the aircraft is still within its base segment 602. Indeed, in certain embodiments, if the current aircraft flight path (e.g., its lateral track and vertical track) intersects with an active approach volume, certain alerts, warnings and terrain displays may be inhibited until the system determines that the aircraft cannot turn into the approach volume while satisfying certain parameters (e.g., at a bank angle of no more than 30° and under no more than 1 "G" acceleration; these parameters may be adjusted by the user or the system.) For example, any alerts, warnings or terrain display on the opposing side of the approach volume may be inhibited.

Figure 11:
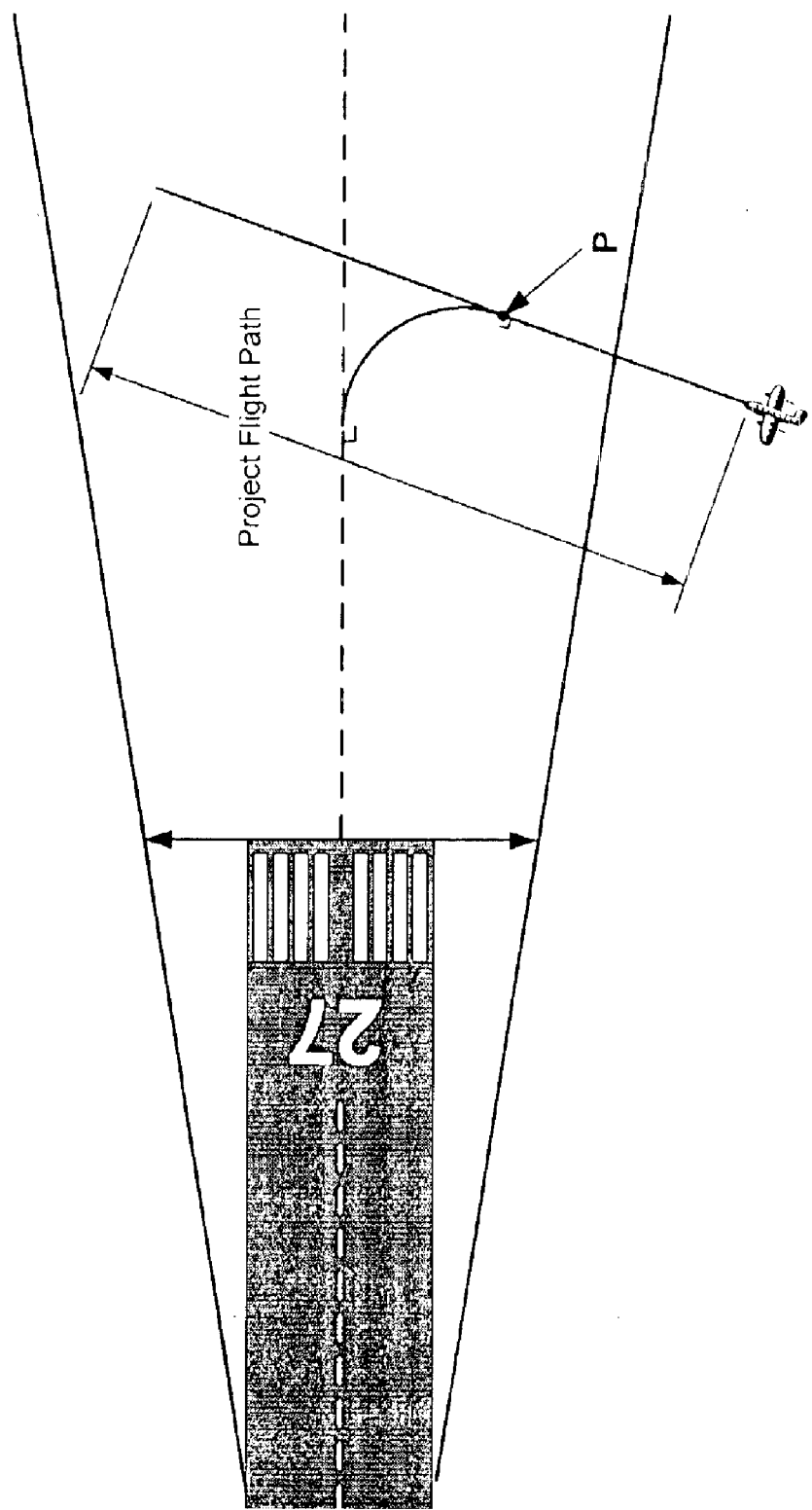
FIG. 11 illustrates a top view of an aircraft with a projected flight path into a lateral side of an approach volume, according to certain embodiments of the present invention.
Figure 12:
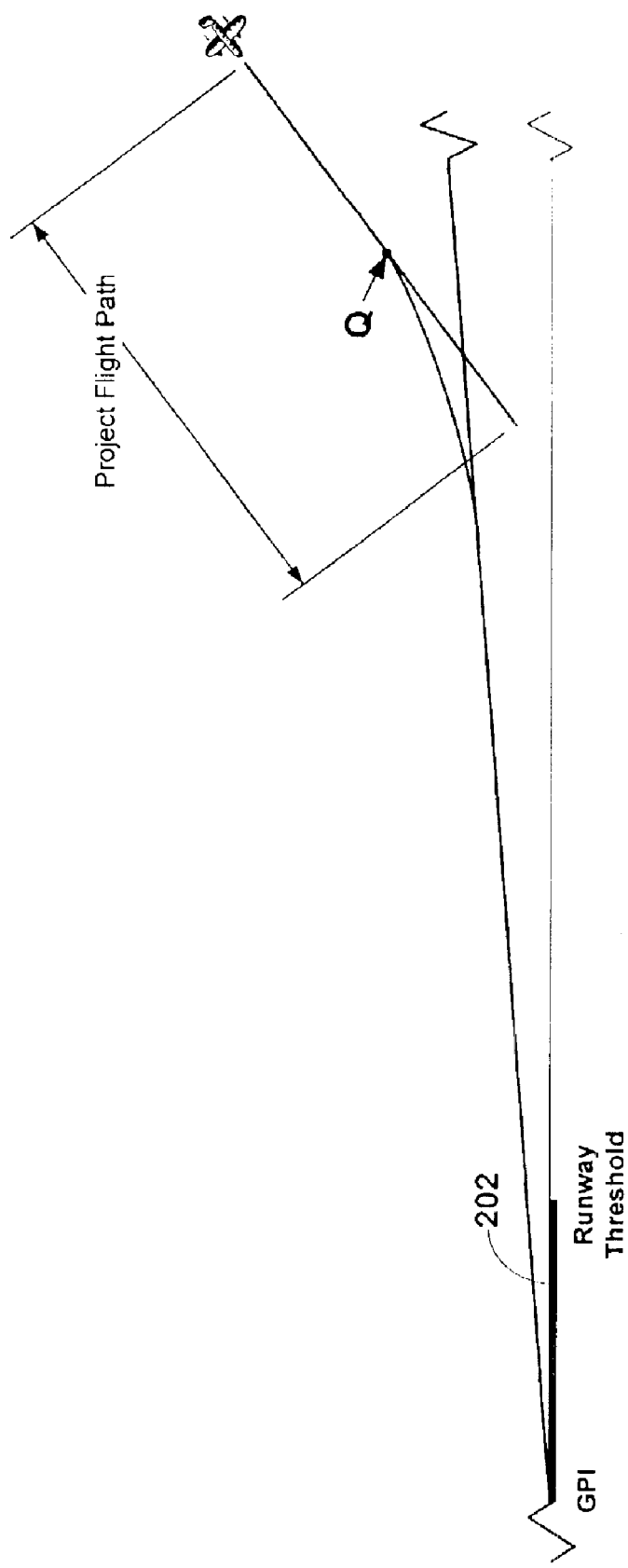
FIG. 12 illustrates a side view of an aircraft with a projected flight path into the top of an approach volume, according to certain embodiments of the present invention.

FIG. 11 illustrates this concept, where P is the point where the aircraft must turn. Similarly, referring to FIG. 12, if the aircraft appears to be dropping into the approach volume, the same information may be inhibited until the system determines that the aircraft cannot pull-up into the approach volume while satisfying certain parameters (e.g., no more that 0.25 "G" of deceleration and maintaining current ground speed). This is illustrated as point Q in FIG. 12. For simplicity only the lower approach path plane is shown in FIG. 12.

Figure 13:
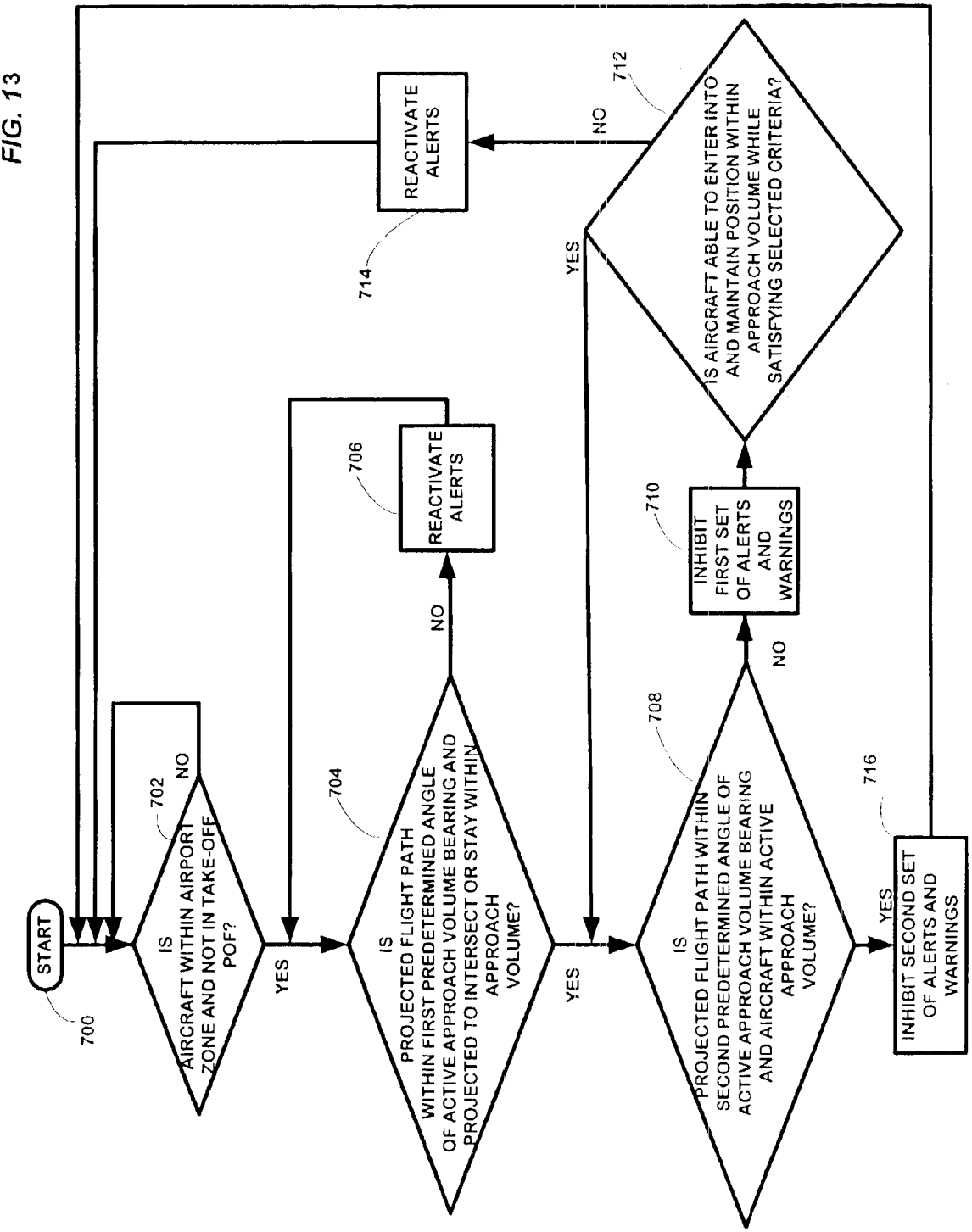
FIG. 13 illustrates a flow chart for determining whether to inhibit alerts and warnings of the aircraft, according to certain embodiments of the present invention.

FIG. 13 illustrates a flow chart for determining whether to inhibit certain alerts and warnings of an aircraft using an embodiment of the present invention.

The process begins in step 700. In step 702, it is determined whether the aircraft is within an airport zone 202 and not in the take-off phase of flight. If the answer is no, the process repeats. If the answer is yes, in step 704, it is determined whether the projected flight path is within a predetermined angle of the bearing of an active approach volume (e.g., within 110°) and its projected flight path will intersect the approach volume (or stay within it).

If the answer in step 704 is no, any inhibited alerts and warnings (explained below) may be reset in step 706. If the answer is yes, it is determined in step 708 whether the aircraft is within an active approach volume and its projected flight path is within a second predetermined angle of the bearing of the active approach volume (e.g., within 45°).

If the answer in step 708 is no, it is determined that the aircraft appears to be in a base flight segment and a first set of alerts and warnings may be inhibited in step 710. Then, in step 712, it is determined whether the aircraft is capable of entering into and maintaining position within the approach path while satisfying selected criteria (e.g., the criteria discussed above with respect to FIGS. 11 and 12). If the answer is yes, the process is repeated starting at step 708. If the answer is no, any deactivated alerts and warnings are reactivated in step 714 and the process repeats from step 702.

If the answer in step 708 is yes, it is determined that the aircraft appears to be in landing approach and a second set of alerts and warnings are inhibited in step 716. Because the system is more confident that the aircraft is landing in step 716 as compared to step 710, the second set may be more comprehensive than the first set of alerts and warnings. The process is then repeated from step 702.

Moreover, terrain display may be inhibited in a similar manner.

Furthermore, while the above description has related to inhibiting alerts and warnings, the present invention may be used to enable and/or create alerts and warnings. For example, if the aircraft is within the approach volume and near the runway, an alert may be generated if the landing gear is not down or the flaps are not down.

Moreover, while the present invention has been described above in terms of inhibiting alerts, warnings and terrain display, the approach path volume may also be used as a navigational guide. That is, instead of ILS (or in addition thereto), the present invention may be used to guide the aircraft to the runway. In particular, the display apparatus may display the approach volume to the pilot for use in landing the aircraft.

It will be understood that the above description has been with respect to particular embodiments of the invention. While this description is fully capable of attaining the objects of the invention, it is understood that the same is merely representative of the broad scope of the invention envisioned, and that numerous variations of the above embodiments may be known or may become known or are obvious or may become obvious to one of ordinary skill in the art, and these variations are fully within the broad scope of the invention. Accordingly, the scope of the invention is to be limited only by the claims appended hereto, and equivalents thereof. In these claims, a reference to an element in the singular is not intended to mean "one and only one" unless explicitly stated. Rather, the same is intended to mean "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for an apparatus or method to address any or every problem sought to be solved by the present invention for it to be encompassed by the present claims. Furthermore, no element, component, or method step in the present invention is intended to be dedicated to the public regardless of whether the element, component, or method step is explicitly recited in the claims. No claim element herein is to be construed under the provisions of 35 U.S.C. §§112, ¶6, unless the element is expressly recited using the phrase "means for".

What is claimed is:

1. A method of reducing at least one of nuisance alerts and warnings in a terrain awareness and warning system for an aircraft, comprising:
   - determining if the aircraft is within a predetermined geometric volume surrounding an airport;
   - if the aircraft is within the geometric volume, then determining the aircraft's projected flight path for a selected time;
   - comparing the aircraft's current projected flight path with at least one approach volume extending for a runway at the airport towards an outer boundary of the geometric volume;
   - if the aircraft's projected flight path is such that the aircraft is expected to be within the approach volume and stay within the approach volume to the runway, then inhibiting at least one selected alert or warning associated with non-threatening terrain.

2. The method of claim 1, wherein said at least one approach volume has a generally wedge-like shape.

3. The method of claim 1, further comprising inhibiting display of at least a portion of terrain data on the terrain awareness and warning system if the aircraft's current projected flight path is such that the aircraft is expected to be within the approach volume and to stay within the approach volume to the runway.

4. The method of claim 1, wherein at least one of said at least one approach volume comprises an offset approach volume and a short straight-in approach volume.

5. The method of claim 1 wherein at least one of said at least one approach volume comprises
   - an approach path glide slope plane that intersects the runway at a first predetermined location and extends to an outer boundary of said airport zone at a predetermined approach path glide slope angle,
   - an upper approach path plane that intersects the runway at a second predetermined location and extends toward an outer boundary of said airport zone, such that it is above the approach path glide slope plane,
   - a lower approach path plane that intersects the runway at the first predetermined location and extends to the outer boundary of said airport zone at a predetermined angle that is less than said predetermined approach path glide slope angle, and
   - lateral boundaries for said approach path glide slope plane, upper approach path plane and lower approach path plane.

6. The method of claim 5, wherein said upper approach path plane comprises two geometric planes such that the upper approach path plane never extends above the predetermined geometric volume.

7. The method of claim 5, wherein said lower approach path plane comprises two geometric planes such that the lower approach path plane provides a step down approach path glide slope angle.

8. The method of claim 5, wherein said a predetermined approach path glide slope angle is selected from the range of about 3° to 5.5°.

9. The method of claim 1, wherein said at least one approach volume has a generally conical shape.

10. A terrain awareness and warning system for an aircraft comprising:
    - a display apparatus which displays terrain within a forward region based on the aircraft's projected flight path and generates alerts and/or warnings for terrain in or proximate to the aircraft's current projected flight path; and an inhibition module which inhibits at least one of said alerts, warnings and terrain display under at least the following condition:
the aircraft is within a predetermined geometric volume surrounding an airport, and
the aircraft's projected flight path is such that the aircraft is or is expected to be within an approach volume that extends from a runway at the airport towards an outer boundary of the geometric volume and to stay within the approach volume to the runway.

11. The system of claim 10, wherein said approach volume has a generally wedge-like shape.

12. The system of claim 10, wherein the approach volume comprises an offset approach volume and a short straight-in approach volume.

13. The system of claim 10, wherein said approach volume comprises
an approach path glide slope plane that intersects the runway at a first predetermined location and extends to an outer boundary of said airport zone at a predetermined approach path glide slope angle,
an upper approach path plane that intersects the runway at a second predetermined location and extends toward an outer boundary of said airport zone, such that it is above the approach path glide slope plane,
a lower approach path plane that intersects the runway at the first predetermined location and extends to the outer boundary of said airport zone at a predetermined angle that is less than said predetermined approach path glide slope angle, and
lateral boundaries for said approach path glide slope plane, upper approach path plane and lower approach path plane.

14. The system of claim 13, wherein said upper approach path plane comprises two geometric planes such that the upper approach path plane never extends above the predetermined geometric volume.

15. The system of claim 13, wherein said lower approach path plane comprises two geometric planes such that the lower approach path plane provides a step down approach path glide slope angle.

16. The system of claim 13, wherein said a predetermined approach path glide slope angle is selected from the range of about 3° to 5.5°.

17. The system of claim 10, wherein said approach volume has a generally conical shape.

18. A method of navigating an aircraft to land on a runway, comprising:
determining if the aircraft is within a predetermined geometric volume surrounding an airport;
if the aircraft is within the geometric volume, then determining the aircraft's projected flight path for a selected time;
comparing the aircraft's projected flight path with an approach volume extending from a runway at the airport towards an outer boundary of the geometric volume;
if the aircraft's current projected flight path is such that the aircraft is or is expected to be within the approach volume and stay within the approach volume to the runway, then indicating that the aircraft is on proper course for landing; and if the aircraft's current projected flight path is such that the aircraft is not and is not expected to be within the approach volume or to stay within the approach volume to the runway, indicating that the aircraft is not on a proper course for landing.

19. A computer method of calculating an approach volume for a runway for use with a terrain awareness and warning system or navigation system in an aircraft, comprising:
(a) loading a predetermined geometric volume surrounding the runway into a computer memory;
(b) selecting a location along said runway as a ground point intercept (GPI);
(c) selecting a most preferred approach path glide slope angle;
(d) selecting lateral boundaries for the approach volume;
(e) postulating a tentative lower approach path plane that intersects the GPI and extends to an outer boundary of the geometric volume at an angle that is a predetermined amount more acute than said approach path glide slope angle;
(f) determining whether the tentative lower approach path plane clears all terrain from the GPI to the outer boundary of the geometric volume by a predetermined safety margin, and if so, selecting the tentative lower approach path plane as an actual lower approach path plane, and if not, increasing the approach path glide slope angle and repeating steps (e) and (f) until the actual lower approach path plane is selected.

20. The method of claim 19, wherein said most preferred approach path glide slope angle is in the range of 3° to 5.5°.

21. A terrain awareness and warning system for an aircraft comprising:
means for displaying terrain within a predetermined look-ahead region based on the aircraft's projected flight path and generating alerts and warnings for terrain in or proximate to the aircraft's current projected flight path; and
means for inhibiting at least one of said alerts, warnings and terrain display under at least the following conditions:
the aircraft is within a predetermined geometric volume surrounding an airport, and
the aircraft's projected flight path is such that the aircraft is or is expected to be within an approach volume that extends from a runway at the airport towards an outer boundary of the geometric volume and to stay within the approach volume to the runway.

22. A method of reducing at least one of nuisance alerts and warnings in a terrain awareness and warning system for an aircraft, comprising:
(a) determining if the aircraft is within a predetermined geometric volume surrounding an airport;
(b) if the aircraft is within the geometric volume, then determining a projected flight path for a selected time for the aircraft;
(c) comparing the aircraft's current projected flight path with at least one approach volume extending from a runway at the airport towards an outer boundary of the geometric volume;
(d) if the aircraft's current projected flight path is such that the aircraft is or is expected to intersect the approach volume, then determining whether the aircraft is capable of maneuvering within said approach volume so as to stay within the approach volume to the runway;

(e) if the determination of step (d) is positive, then inhibiting at least one of selected alerts and warnings associated with terrain and repeating step (d);

(f) if the determination of step (d) is negative, then reactivating any previously inhibited alerts and warnings of step (e).

23. The method of claim 22, wherein said at least one approach volume has a generally wedge-like shape.

24. The method of claim 22, further comprising inhibiting the display of at least a portion of terrain data on the terrain awareness and warning system in step (d).

25. The method of claim 22, wherein at least one of said at least one approach volume comprises an offset approach volume and a short straight-in approach volume.

26. The method of claim 22 wherein at least one of said at least one approach volume comprises an approach path glide slope plane that intersects the runway at a first predetermined location and extends to an outer boundary of said airport zone at a predetermined approach path glide slope angle, an upper approach path plane that intersects the runway at a second predetermined location and extends toward an outer boundary of said airport zone, such that it is above the approach path glide slope plane, a lower approach path plane that intersects the runway at the first predetermined location and extends to the outer boundary of said airport zone at a predetermined angle that is less than said predetermined approach path glide slope angle, and lateral boundaries for said approach path glide slope plane, upper approach path plane and lower approach path plane.

27. The method of claim 26, wherein said upper approach path plane comprises two geometric planes such that the upper approach path plane never extends above the predetermined geometric volume.

28. The method of claim 26, wherein said lower approach path plane comprises two geometric planes such that the lower approach path plane provides a step down approach path glide slope angle.

29. The method of claim 26, wherein said a predetermined approach path glide slope angle is selected from the range of about 3° to 5.5°.

30. The method of claim 22, wherein said at least one approach volume has a generally conical shape.

* * * * *

UNITED STATES PATENT AND TRADEMARK OFFICE
CERTIFICATE OF CORRECTION

| | |
|---|---|
| PATENT NO. | : 6,889,124 B2 |
| APPLICATION NO. | : 10/391452 |
| DATED | : May 3, 2005 |
| INVENTOR(S) | : Gerald J. Block et al. |

It is certified that error appears in the above-identified patent and that said Letters Patent is hereby corrected as shown below:

Title Page, (57) Abstract, line 11, before "stay", insert -- to -- .

Col. 1, Line 11, before "Provisional", insert -- Continuation-in-part of U.S. --

Col. 1, Line 54, after "volume", change "extendsing" to -- extending -- .

Col. 1, Line 58, before "stay", insert -- to -- .

Col. 2, Line 19, before "stay", insert -- to -- .

Col. 2, Line 49, before "angle", insert -- an -- .

Col. 6, Line 17, after "and", change "200'"" to -- 202" -- .

Col. 6, Line 18, after "runway", change "200'"" to -- 202" -- .

Col. 6, Line 19, change "200'"" to -- 202" -- .

Col. 9, Line 34, after "zone", change "202" to -- 200 --.

Col. 10, Line 61, after "zone", change "202" to -- 200 --.

Claim 1, Col. 12, Line 18, before "stay", insert -- to -- .

Claim 8, Col. 12, Line 59, before "predetermined", delete -- a -- .

Signed and Sealed this

Twenty-first Day of August, 2007

JON W. DUDAS
*Director of the United States Patent and Trademark Office*